Sept. 4, 1923.
W. C. LEONARD
VEHICLE WHEEL
Filed July 18, 1921
1,467,180
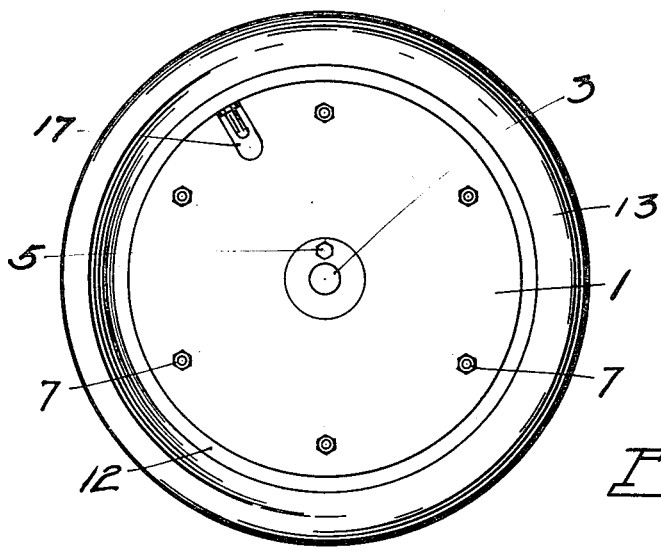
Fig. 1
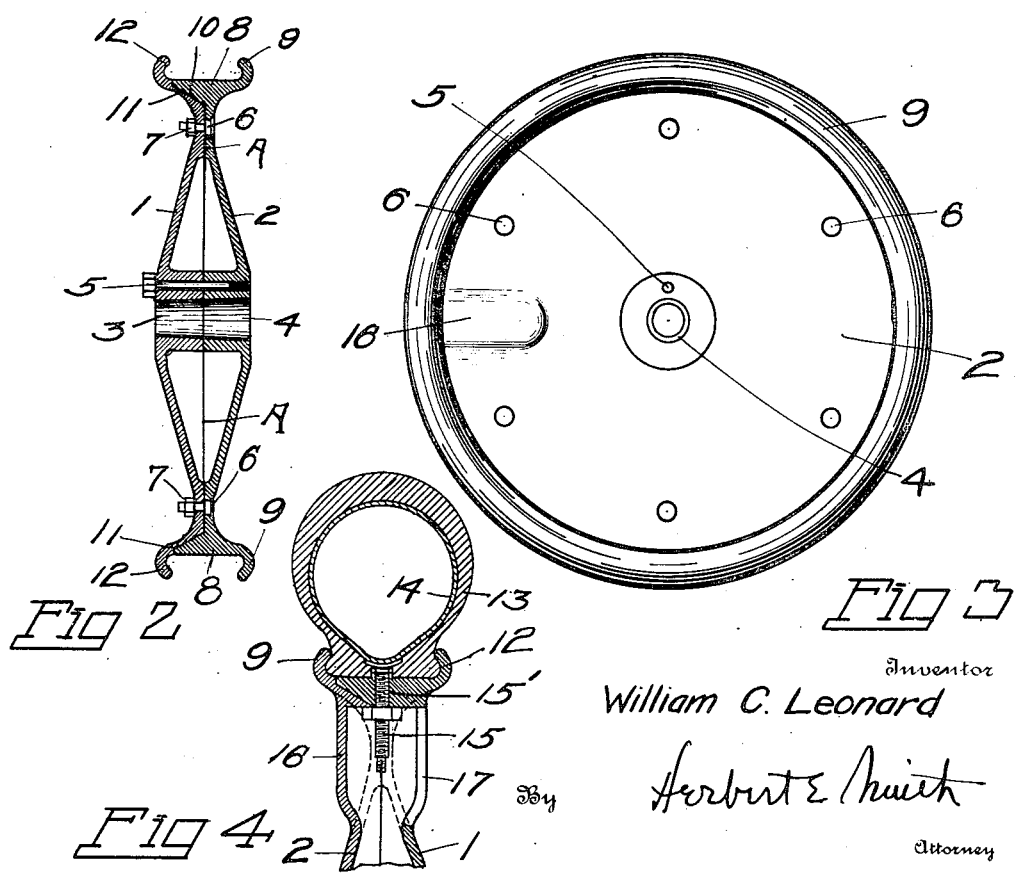
Fig. 2
Fig. 3
Fig. 4
Inventor
William C. Leonard
By Herbert E. Smith
Attorney Patented Sept. 4, 1923.

1,467,180

UNITED STATES PATENT OFFICE.

WILLIAM CLYDE LEONARD, OF LEWISTON, IDAHO, ASSIGNOR TO LEONARD ROLLER GEAR DRIVE THRESHER COMPANY, OF LEWISTON, IDAHO.

VEHICLE WHEEL.

Application filed July 18, 1921. Serial No. 485,587.

*To all whom it may concern:*

Be it known that I, WILLIAM C. LEONARD, a citizen of the United States, residing at Lewiston, in Nez Perce County and State of Idaho, have invented certain new and useful Improvements in Vehicle Wheels, of which the following is a specification.

My present invention relates to improvements in vehicle wheels of the disk type, especially adapted for automobiles, trucks and other automotive vehicles, and embodying the combination of a pair of side plates or disks having special features of construction at their perimeters for forming the wheel rim or tire channel. The invention consists in certain combinations and arrangements of the metallic disks for permitting facile and convenient manipulation of the wheel and rim when dismounting a tire case or casing for repair, as well as for assembling the parts. The invention also involves certain novel features of construction for strengthening and bracing the wheel structure within the rim in both radial and lateral directions, as will be hereinafter more fully pointed out and claimed.

In the accompanying drawings I have illustrated one complete example of the physical embodiment of my invention involving a circumferentially divided rim and sectional disk wheel, in which the parts are combined and arranged according to the best mode I have thus far devised for the practical application of the principles of my invention.

Figure 1 is a view in side elevation of a wheel embodying my invention.

Figure 2 is a transverse, vertical sectional view through the disk members and channel rim, the tire being omitted.

Figure 3 is a view showing the reverse side of Figure 1.

Figure 4 is an enlarged detail sectional view showing the provision in the structure of the disks of the wheel for accommodation of the tire valve.

In the preferred form of the invention as illustrated in the drawings the wheel is made up of two metallic disks 1 and 2 stamped or bent to complementary shape in suitable machines, or cast or wrought in any suitable and convenient manner, as desired. At their centers the disks, which are cupped or dished as shown in Figure 2, are fashioned with complementary, integral hub sections 3 and 4, of equal width and with their edges abutting to form a continuous bore or hub opening, preferably tapered for fixture on the axle journal. Bolt openings are provided in the walls of the hub members or sections, and these alined openings are designed to receive the comparatively long locking bolt 5 passed through the hub section of the outer disk 1 and threaded into the opening of the inner hub section, in order that access may readily be had to this bolt for locking or unlocking the disks. The location of the long locking bolt 5 adjacent to the hub of the wheel insures a stable and rigid connection and prevents dislocation of the parts.

At the central portion of the wheel the disks are spaced apart by the hub sections, and toward the periphery of the wheel the disks are brought together with flat annular faces A in contact and rigidly held by means of the short, transverse studs or bolts 6 and nuts 7. The heads of the bolts are preferably countersunk, and at the inner side of the wheel, while the nuts 7 are located at the outer side of the wheel for ready access in mounting or dismounting the tire.

In the formation of the channel rim for the wheel I utilize a thickened, ring or rim section 8 at the periphery of the disk 2 having a flat annular face and bounded by the lateral flange 9 extending around the rim, and at its outer side this disk is fashioned with a conical wall 10 forming a tapered recess, of which the flat face A forms the bottom. The outer disk 1 is fashioned with a complementary conical or tapered, annular face 11 fitting closely and neatly against the wall of the tapered recess 10, and this outer disk has a flange 12 complementary to the flange 9 forming the retaining members for the side walls or beads of the tire casing 13, as in Figure 4.

Within the tire casing 13 the usual inner tube 14 is shown in Figure 4, and the standard form of valve 15 is passed through an opening 15′ in the rim 8. For the accommodation of the tire valve the disk 2 is recessed as at 16, and the disk 1 is slotted as at 17 through which slotted opening the valve is readily accessible when required.

In dismounting the tire it will readily be seen that the disk 2 with its tire supporting rim 8 may be retained on the axle, while the outer disk 1 may be withdrawn after the bolts 5 and 6 have been displaced, by removing the hub section from the axle, thereby releasing the tire casing from the divided rim. This outer disk may be replaced by slipping the hub section 3 over the axle and bringing the two faces A of the disks and the complementary tapered faces 10 and 11 of the disks in close frictional contact, after which the bolts 5 and 6 are replaced and tightened. In this manner the hub sections are firmly secured on the axle and the conical portion of the disk 1 is fitted into the recessed portion of the disk 2 and there held to reinforce the rim in supporting a load in radial direction, and also to strengthen and brace the wheel in absorbing strains in lateral directions. In addition to reinforcing the inner disk, and bearing a portion of the load imposed thereon, the outer disk forms the means for securing the tire casing within the channel of the rim, thus providing a wheel composed of a practical minimum of parts, which is strong and durable, and easily handled.

Having thus fully described my invention, what I claim as new and desire to secure by Letters Patent is—

The combination in a wheel of a pair of spaced disks having alined hub sections and abutting frictionally engaged annular faces at their peripheries, a locking bolt in said hub sections and securing bolts passed through said disks at their annular faces, the inner disk having a rim and side flange and a tapered annular recess on the side opposite said flange, a side flange on the outer disk and said disk formed with a conical portion to engage in said annular recess.

In testimony whereof I affix my signature.

WILLIAM CLYDE LEONARD.